(12) United States Patent
Smithberger et al.

(10) Patent No.: US 7,335,131 B2
(45) Date of Patent: Feb. 26, 2008

(54) VEHICLE AND METHOD FOR CONTROLLING AN ENGINE IN A VEHICLE

(75) Inventors: Pat Smithberger, Howell, MI (US); Christopher Lear, Dearborn, MI (US); Suzanne Stuber, Livonia, MI (US); Douglas Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 11/161,097

(22) Filed: Jul. 22, 2005

(65) Prior Publication Data
US 2007/0021265 A1    Jan. 25, 2007

(51) Int. Cl.
*B60K 1/02* (2006.01)
(52) U.S. Cl. .......................................... 477/3
(58) Field of Classification Search .................... 477/3, 477/111, 112, 113; 180/65–7; 903/909
See application file for complete search history.

(56) References Cited

U.S. PATENT DOCUMENTS

| | | | |
|---|---|---|---|
| 5,235,946 A | 8/1993 | Fodale et al. | |
| 5,467,008 A | 11/1995 | Uchinami | |
| 5,520,149 A | 5/1996 | Kang | |
| 5,712,786 A | 1/1998 | Ueda | |
| 5,998,881 A | 12/1999 | Wind et al. | |
| 6,274,944 B1 | 8/2001 | Letang | |
| 6,687,582 B1 | 2/2004 | De La Salle et al. | |
| 6,994,360 B2 * | 2/2006 | Kuang et al. ............. | 180/65.2 |
| 2002/0163199 A1 | 11/2002 | Ramaswamy et al. | |
| 2004/0206332 A1 | 10/2004 | Mathews et al. | |
| 2004/0254045 A1 | 12/2004 | McGee et al. | |
| 2004/0266285 A1 | 12/2004 | Kanno et al. | |
| 2005/0177301 A1 | 8/2005 | Bishop et al. | |

FOREIGN PATENT DOCUMENTS

| | | |
|---|---|---|
| EP | 0915245 B1 | 5/2003 |
| GB | 2294337 A | 4/1996 |

OTHER PUBLICATIONS

Search Report under Section 17, dated May 24, 2007, 1 page.

* cited by examiner

*Primary Examiner*—Dirk Wright
(74) *Attorney, Agent, or Firm*—David B. Kelley; Brooks Kushman P.C.

(57) ABSTRACT

A method for controlling an engine in a vehicle including a transmission is provided. The method utilizes feedforward control by determining when a neutral transmission gear is selected, and adjusting an engine parameter to control the engine operation based on at least one predetermined condition when it is determined that the neutral transmission gear has been selected. The at least one predetermined condition includes having a value of a vehicle parameter, such as a battery state of charge, being outside a predetermined range.

20 Claims, 2 Drawing Sheets

VEHICLE AND METHOD FOR CONTROLLING AN ENGINE IN A VEHICLE

BACKGROUND OF THE INVENTION

1. Field of the Invention

The present invention relates to a vehicle and method of controlling an engine in a vehicle.

2. Background Art

An engine in a vehicle may be subject to a variety of loading conditions, some of which may be based on operation of systems within the vehicle, rather than propelling the vehicle itself. Thus, operation of an air conditioning system within the vehicle may provide an added load to the engine. For example, the engine may mechanically drive an air conditioning compressor, or may drive an alternator to provide increased electrical power for operation of the compressor.

Additional loads can also be placed on the engine when the engine is used to provide torque to an alternator or generator which is used to charge a battery. Such a load on the engine may be particularly high in the case of a high voltage battery having a large storage capacity, such as found in a hybrid electric vehicle (HEV). In situations where one or more vehicle systems apply a load to the engine, one or more engine parameters may need to be adjusted to increase the engine output. For example, an increase in the air flow provided to the engine can be used to increase the engine output torque to provide the necessary power required by the vehicle systems.

As the load on an engine is increased, the speed of the engine may change, unless a control system is in place to compensate for the increased load. One example of an idle speed control for an engine is described in U.S. Pat. No. 5,712,786 issued to Ueda on Jan. 27, 1998. The method and apparatus of Ueda is configured to provide compensation for a sudden increase in electric load during engine idle. The electric load current value that is to be outputted from the alternator is obtained, and the air intake to the engine is increased in accordance with the obtained current value. This control system is used to keep the engine idle speed approximately constant. One limitation of the method and apparatus described in Ueda is the need to quickly detect the application of the increased electric load, so that the control system can quickly respond to maintain the engine idle speed. Such a system relies on a feedback control, which may provide a slower response as compared to a feedforward control.

In many vehicles, the loads applied to the engine by the vehicle systems will be relatively independent of the operation of the vehicle itself. For example, an air conditioning system which applies a load to the engine, will apply such a load regardless of whether the vehicle is stationary or moving, or whether the transmission is in a forward, reverse, or neutral gear. In some vehicles, however, the load on the engine may be directly dependent on the operation of the vehicle. For example, in an HEV, or other vehicle that does not utilize a disconnect clutch between the engine and the vehicle wheels, some or all of the loads applied to the engine may be removed when the transmission is shifted into neutral. This may be desirable to help ensure that the engine does not inadvertently provide an output torque to the vehicle wheels when the transmission is in neutral. If, prior to shifting into neutral, the engine was subject to a particularly high loading condition, the engine speed could increase suddenly when the load is removed—i.e., when the transmission is shifted into neutral. Although it may be possible to use a feedback control system to compensate for the removal of the load on the engine, the engine speed may have already increased to an undesirably high value before the speed is adjusted.

Therefore, a need exists for a control system that utilizes a feedforward control to quickly adjust engine operating parameters when an event occurs that would facilitate a change in engine loading conditions.

SUMMARY OF THE INVENTION

One advantage of the present invention is that it provides a control system utilizing a feedforward control which can adjust engine parameters without waiting for engine conditions to change.

Another advantage of the present invention is that it provides a control system which can act upon detection of an event to provide proactive control of engine operation.

The present invention also provides a method for controlling an engine in a vehicle including a transmission. The method includes determining when a neutral transmission gear is selected, and determining a value of a vehicle parameter. An engine parameter is adjusted to control engine operation based on at least one predetermined condition when it is determined that the neutral transmission gear has been selected. The at least one predetermined condition includes the value of the vehicle parameter being outside a predetermined range.

The invention further provides a method for controlling an engine in a vehicle including a vehicle system that can selectively apply a load to the engine. The method includes determining a vehicle parameter related to engine load. The method also includes detecting an event that facilitates removal of a load on the engine applied by the vehicle system. An engine parameter is adjusted to control engine operation when the event is detected and at least one predetermined condition is met. The at least one predetermined condition includes the value of the vehicle parameter being outside a predetermined range.

The invention also provides a vehicle having wheels, that includes an engine and a vehicle system capable of applying a load to the engine. A transmission is configured to transfer torque to at least one of the vehicle wheels. A control system, including at least one controller, is in communication with the engine and the transmission. The control system is configured to receive signals related to a vehicle parameter indicative of engine load. The control system is also configured to determine when a neutral transmission gear is selected and to adjust an engine parameter to control engine operation when it is determined that the neutral transmission gear has been selected, and a value of the vehicle parameter is outside a predetermined range.

DETAILED DESCRIPTION OF THE PREFERRED EMBODIMENT(S)

Figure 1:
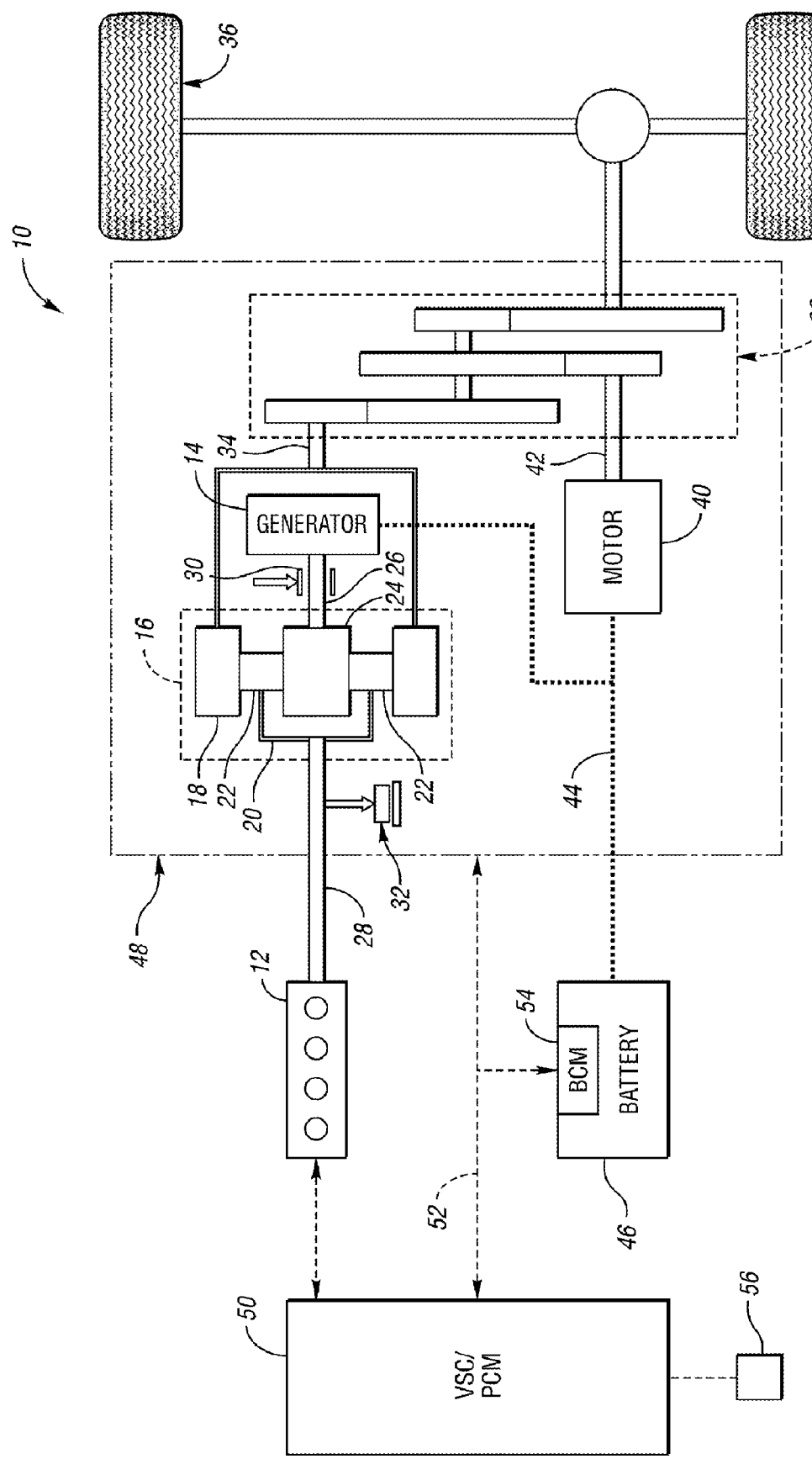
FIG. 1 is a schematic representation of an exemplary vehicle powertrain system in accordance with the present invention.

FIG. 1 shows a schematic representation of a vehicle 10 in accordance with one embodiment of the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions, may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a shaft 28 connected to the carrier 20. A brake 30 is provided for stopping rotation of the shaft 26, thereby locking the sun gear 24 in place. Because this configuration allows torque to be transferred from the generator 14 to the engine 12, a one-way clutch 32 is provided so that the shaft 28 rotates in only one direction. Having the generator 14 operatively connected to the engine 12, as shown in FIG. 1, allows the speed of the engine 12 to be controlled by the generator 14.

The ring gear 18 is connected to a shaft 34, which is connected to vehicle drive wheels 36 through a second gear set 38. The vehicle 10 includes a second electric machine, or motor 40, which can be used to output torque to a shaft 42. Other vehicles within the scope of the present invention may have different electric machine arrangements, such as more or less than two electric machines. In the embodiment shown in FIG. 1, the motor 40 and the generator 14 can both be used as motors to output torque. Alternatively, each can also be used as a generator, outputting electrical power to a high voltage bus 44 and to an energy storage device, or battery 46.

The battery 46 is a high voltage battery that is capable of outputting electrical power to operate the motor 40 and the generator 14. Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear set 16, and a portion of the second gear set 38 may generally be referred to as a transaxle 48. The transaxle 48 is analogous to a transmission in a conventional vehicle. Thus, when a driver selects a particular gear, the transaxle 48 is appropriately controlled to provide that gear. To control the engine 12 and the components of the transaxle 48—e.g., the generator 14 and motor 40—a control system, including a controller 50, is provided. As shown in FIG. 1, the controller 50 is a combination vehicle system controller and powertrain control module (VSC/PCM). Although it is shown as a single hardware device, it may include multiple controllers in the form of multiple hardware devices, or multiple software controllers within one or more hardware devices.

A controller area network (CAN) 52 allows the VSC/PCM 50 to communicate with the transaxle 48 and a battery control mode (BCM) 54. Just as the battery 46 has the BCM 54, other devices controlled by the VSC/PCM 50 may have their own controllers. For example, an engine control unit (ECU) may communicate with the VSC/PCM 50 and may perform control functions on the engine 12. In addition, the transaxle 48 may include one or more controllers, such as a transaxle control module (TCM), configured to control specific components within the transaxle 48, such as the generator 14 and/or the motor 40. Some or all of these controllers may be a part of a control system for the present invention.

In addition to inputs from the transaxle 48, the VSC/PCM 50 may include inputs from other vehicle systems. For example, also shown in FIG. 1 is a transmission gear selector 56 which communicates to the VSC/PCM 50 which gear the driver has selected—e.g., park, neutral, forward or reverse. Although the vehicle 10, shown in FIG. 1, is an HEV, it is understood that the present invention contemplates the use of other types of vehicles, including conventional "engine-only" vehicles. In addition, although the vehicle 10 shown in FIG. 1 is a parallel-series HEV, the present invention is not limited to HEV's having such a "powersplit" configuration.

As discussed above, certain types of vehicles may cause a change in the engine loading condition depending on the operating state of the vehicle. For example, the generator 14 may provide a reaction torque to the engine 12 which depends on the requirements of various systems within the vehicle 10. For example, if it is determined that a state of charge (SOC) of the battery 46 is below some predetermined value, the generator 14 may provide a large reaction torque to the engine 12 in order to charge the battery 46. The VSC/PCM 50, which is in communication with the engine 12, the transaxle 48, and the BCM 54, can determine the SOC based on signals received from the BCM 54, and can in turn provide commands to the generator 14 and the engine 12 to ensure that the battery 46 is properly charged. Other vehicle systems may cause an increase in the load on the engine, for example, an air conditioning system (not shown) can cause such an increase when it is started. In such cases, the VSC/PCM 50 will detect signals indicating the application of the load, and will provide the appropriate commands to ensure that there is adequate power provided to the necessary systems.

As shown in FIG. 1, the vehicle 10 does not include a disconnect clutch to completely isolate the engine output from the vehicle wheels 36. In order to ensure that torque output by the engine 12 is not received by the vehicle wheels 36 when the transaxle 48 is shifted into a neutral gear, various control systems and methods may be employed. U.S. patent application Publication No. 2004/0254045, entitled "System And Method For Controlling Engine Idle In A Vehicle," published on Dec. 16, 2004, describes such a system and method, and is hereby incorporated herein by reference.

One such system examines when the transaxle 48 is shifted into a neutral gear, and uses the generator 14 to counteract any torque output by the engine 12. Alternatively, the generator 14 can be controlled to provide no reaction torque to the engine 12, such that all of the torque output from the engine 12 is used to spin the generator 14, which is allowed to rotate freely. Using this latter control system, all external loads are effectively removed from the engine 12 when the transaxle 48 is shifted into neutral. As noted above, without any additional control systems, the speed of the engine 12 may become undesirably high.

Figure 2:
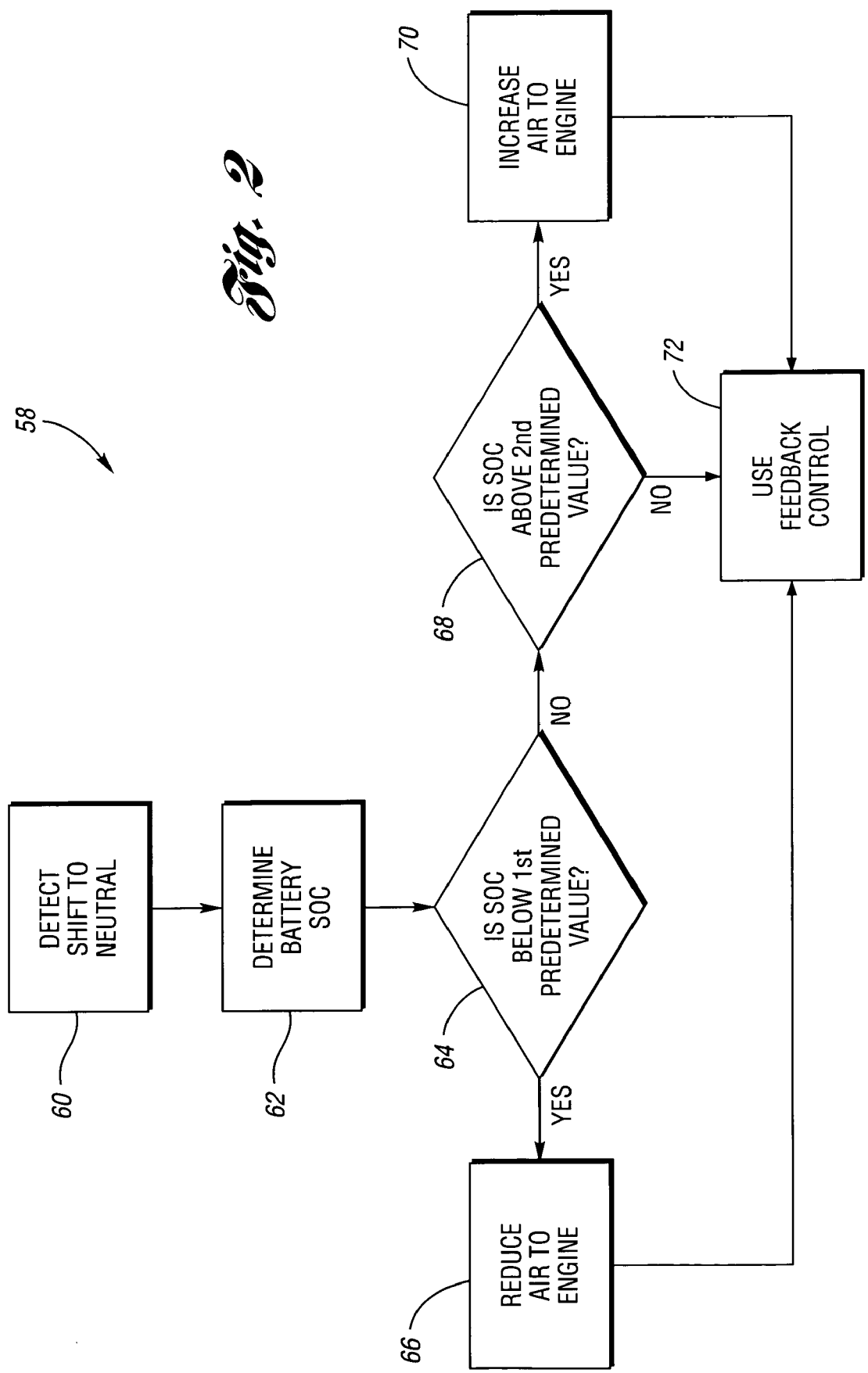
FIG. 2 is a flowchart illustrating a method of the present invention.

As noted above, one control system that can be used to adjust the engine speed in such a case is a feedback system that would first measure the engine speed, compare it some predetermined engine speed range, and then make adjustments based on a calculated speed error. Such a system can be programmed into a controller, such as the VSC/PCM 50, and may be included in embodiments of the present invention. In addition, the present invention also provides a feedforward control system which can react more quickly to potential changes in engine loading conditions. For example, FIG. 2 shows a high level flowchart which illustrates one embodiment of the present invention. At the outset, it is noted that although the various steps shown in the flowchart 58 appear to occur in a chronological sequence, at least some of the steps may occur in a different order, and some steps may be performed concurrently.

As shown in FIG. 2, the first step 60 is to detect a shift into a neutral gear. This can be communicated to the VSC/PCM 50 via the transmission gear selector 56, or it may be detected directly from signals provided to the VSC/PCM 50 by the transaxle 48. It is worth noting that although step 60 specifically recites detecting a shift into a neutral gear, the present invention contemplates detection of any event that could facilitate removal of some or all of the loads applied to an engine, such as the engine 12, by one or more vehicle systems.

At step 62, the battery SOC is determined. The battery SOC is indicative of the engine load. For example, if the SOC is below a certain value—e.g., 45%—the generator 14 may apply additional loading to the engine 12 in order to charge the battery 46. Conversely, if the SOC is above a certain amount, the engine 12 may be operated at a reduced load so that the battery 46 is not overcharged. Thus, the BCM 54 can provide to the VSC/PCM 50 one or more signals related to the SOC, which provide an indication of the load on the engine 12.

It is worth noting that the battery SOC is just one vehicle parameter which could be used in accordance with the present invention. For example, the generator 14 can be operated to supply more or less reaction torque to the engine 12 based on the requirements of the vehicle 10, and the various systems within it. Thus, a torque command provided to the generator 14 can be the vehicle parameter used as an indicator of the load on the engine 12. Of course, these are just two such examples of vehicle parameters which can be used by the VSC/PCM 50 as an indicator of the engine load.

At decision block 64, it is determined whether the SOC is below a first predetermined state of charge. Another way to view this is whether the SOC is outside some predetermined range. For example, if a desired range for the SOC is 45–50%, than the SOC will be outside this range if it is below a state of charge of 45%. Of course, these values are used merely for illustration, and different values may be used depending on how the present invention is implemented. For example, there may be a sliding scale whereby the load on the engine 12 increases as the battery SOC decreases. Moreover, after the battery SOC reaches some value, the load on the engine may be decreased in accordance with a sliding scale to ensure that the battery 46 is not overcharged. Thus, the load on the engine 12 may be affected regardless of the battery SOC, and yet at some chosen middle range, the effect on the engine load may be so small as to be negligible for purposes of the present invention.

Returning to FIG. 2, it is shown that if the SOC is below the predetermined value, an amount of air provided to the engine 12 is reduced at step 66. As noted above, the steps shown in the method 58 are not necessarily in chronological order. For example, the VSC/PCM 50 may obtain regular updates from the BCM 54 regarding the battery SOC. Therefore, once the shift into the neutral gear is detected at step 60, the VSC/PCM 50 can provide an almost immediate response—see, for example, step 66—such that it provides a true feedforward control that does not require the engine speed to go outside a predetermined range before adjustments are made.

If, at decision block 64, it is determined that the SOC is not below the first predetermined value, it is then determined at decision block 68 whether the SOC is above some second predetermined value. As noted above, the first and second predetermined values may define an optimal SOC range, such as 45–50%. If it is determined that the battery SOC is above the second predetermined value, the VSC/PCM 50 provides a command to increase the amount of air flow to the engine 12—see step 70. As noted above, the load applied to the engine 12 may be reduced in situations where the SOC is relatively high, so that the battery 46 is not overcharged. Once the transaxle 48 is shifted into neutral, the extra load, or reduced load, on the engine 12, is removed when the generator 14 is allowed to spin freely. Thus, an increase in air flow to the engine 12 may be required after the shift to neutral so that stable combustion is maintained.

It is worth noting that the reduction and increase in air flow as illustrated respectively in steps 66 and 70, represent just one type of engine parameter that can be adjusted in accordance with the present invention. For example, the spark timing of the engine 12 or the amount of fuel provided to the engine 12 could be adjusted instead of an adjustment to the air flow, or more than one of these parameters can be adjusted together, as desired. Moreover, in the case of a direct injection engine, the timing of the fuel injection may be adjusted to effect the desired engine control.

Returning to FIG. 2, it is shown that if the SOC is not above the predetermined value as determined in decision block 68, the control system reverts to feedback control, as shown in step 72. The feedback control is also the default which will be used after an engine parameter is adjusted, for example, at step 66 or step 70. The feedforward control system which is used to adjust one or more engine parameters—see step 66 and step 70—may continue for some predetermined time before the engine control is returned to a feedback control system at step 72. Moreover, the feedback control may be utilized for some engine loading conditions which do not have as profound an effect on the engine 12 as the battery SOC. The feedback control shown in step 72 may be implemented as described above, wherein the VSC/PCM 50 monitors the speed of the engine 12, and makes adjustments based on some speed error, such as when the engine speed is outside a predetermined range.

While the best mode for carrying out the invention has been described in detail, those familiar with the art to which this invention relates will recognize various alternative designs and embodiments for practicing the invention as defined by the following claims.

What is claimed is:

1. A method for controlling an engine in a vehicle including a transmission, the method comprising:
    determining when a neutral transmission gear is selected;
    determining a value of a vehicle parameter; and
    adjusting an engine parameter to control engine operation based on at least one predetermined condition when it is determined that the neutral transmission gear has been selected, the at least one predetermined condition including the value of the vehicle parameter being outside a predetermined range.

2. The method of claim 1, the vehicle further including a battery operative to supply electric power to at least one vehicle component, wherein the vehicle parameter is a state of charge of the battery, and adjusting the engine parameter includes adjusting an amount of air flow to the engine.

3. The method of claim 2, wherein the at least one predetermined condition includes the battery state of charge being below a first predetermined state of charge, and adjusting the engine parameter includes reducing the amount of air flow to the engine.

4. The method of claim 2, wherein the at least one predetermined condition includes the battery state of charge being above a second predetermined state of charge, and adjusting the engine parameter includes increasing the amount of air flow to the engine.

5. The method of claim 1, the vehicle further including an electric machine operative to selectively supply a reaction torque to the engine based on a torque command to the electric machine, wherein the vehicle parameter is the torque command to the electric machine, and the at least one predetermined condition includes the torque command to the electric machine being above a predetermined torque command.

6. The method of claim 1, wherein adjusting the engine parameter includes at least one of adjusting a spark timing of the engine, adjusting an amount of fuel provided to the engine, or adjusting a fuel injection timing.

7. The method of claim 1, further comprising:
determining a speed of the engine after the neutral transmission gear has been selected; and
adjusting the engine speed when the determined engine speed is outside a predetermined engine speed range, thereby providing a feedback control.

8. A method for controlling an engine in a vehicle including a vehicle system that can selectively apply a load to the engine, the method comprising:
determining a vehicle parameter related to engine load;
detecting an event that facilitates removal of a load on the engine applied by the vehicle system; and
adjusting an engine parameter to control engine operation when the event is detected and at least one predetermined condition is met, the at least one predetermined condition including the value of the vehicle parameter being outside a predetermined range.

9. The method of claim 8, the vehicle further including a transmission, wherein the event that facilitates removal of a load on the engine applied by the vehicle system is the selection of a neutral transmission gear.

10. The method of claim 9, the vehicle system including an electric machine operative to selectively apply a load to the engine based at least in part on a torque command to the electric machine, wherein the vehicle parameter related to engine load is the torque command to the electric machine, and the at least one predetermined condition includes the torque command to the electric machine being above a predetermined torque command.

11. The method of claim 9, the vehicle further including a battery and the vehicle system including an electric machine configured to apply a load to the engine to facilitate charging the battery, wherein the vehicle parameter related to engine load is a state of charge of the battery.

12. The method of claim 11, wherein the at least one predetermined condition includes the battery state of charge being below a first predetermined state of charge, and adjusting the engine parameter includes reducing the amount of air flow to the engine.

13. The method of claim 11, wherein the at least one predetermined condition includes the battery state of charge being above a second predetermined state of charge, and adjusting the engine parameter includes increasing the amount of air flow to the engine.

14. The method of claim 8, wherein adjusting the engine parameter includes at least one of adjusting a spark timing of the engine, adjusting an amount of fuel provided to the engine, or adjusting a fuel injection timing.

15. A vehicle having wheels, comprising:
an engine;
a vehicle system capable of applying a load to the engine;
a transmission configured to transfer torque to at least one of the vehicle wheels; and
a control system including at least one controller, the control system being in communication with the engine and the transmission and configured to:
receive signals related to a vehicle parameter indicative of engine load,
determine when a neutral transmission gear is selected, and
adjust an engine parameter to control engine operation when it is determined that the neutral transmission gear has been selected, and a value of the vehicle parameter is outside a predetermined range.

16. The vehicle of claim 15, the vehicle further comprising a battery operative to supply electric power to at least one vehicle component, and
wherein the vehicle parameter related to engine load is a state of charge of the battery, and adjusting the engine parameter includes adjusting an amount of air flow to the engine.

17. The vehicle of claim 16, wherein the value of the vehicle parameter is outside the predetermined range when the battery state of charge is below a first predetermined state of charge, and adjusting the engine parameter includes reducing the amount of air flow to the engine.

18. The vehicle of claim 16, wherein the value of the vehicle parameter is outside the predetermined range when the battery state of charge is above a second predetermined state of charge, and adjusting the engine parameter includes increasing the amount of air flow to the engine.

19. The vehicle of claim 15, wherein the vehicle system includes an electric machine operative to selectively supply a reaction torque to the engine based on a torque command to the electric machine, and
wherein the vehicle parameter is the torque command to the electric machine, and the value of the vehicle parameter is outside the predetermined range when the torque command to the electric machine is above a predetermined torque command.

20. The vehicle of claim 15, wherein the control system is further configured to determine a speed of the engine after the neutral transmission gear has been selected, and adjust the engine speed when the determined engine speed is outside a predetermined engine speed range, thereby providing a feedback control.

* * * * *